Patented July 18, 1950

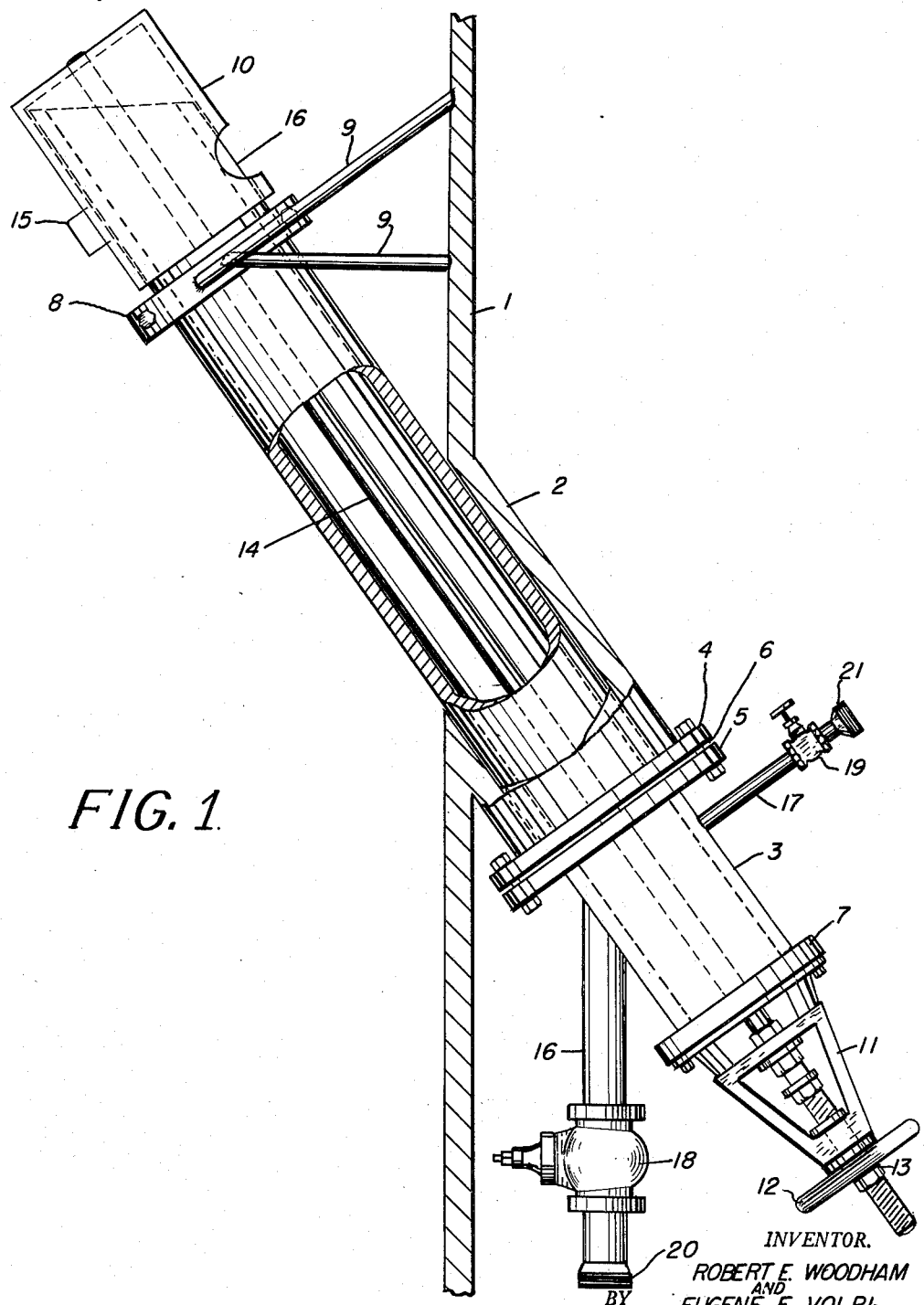

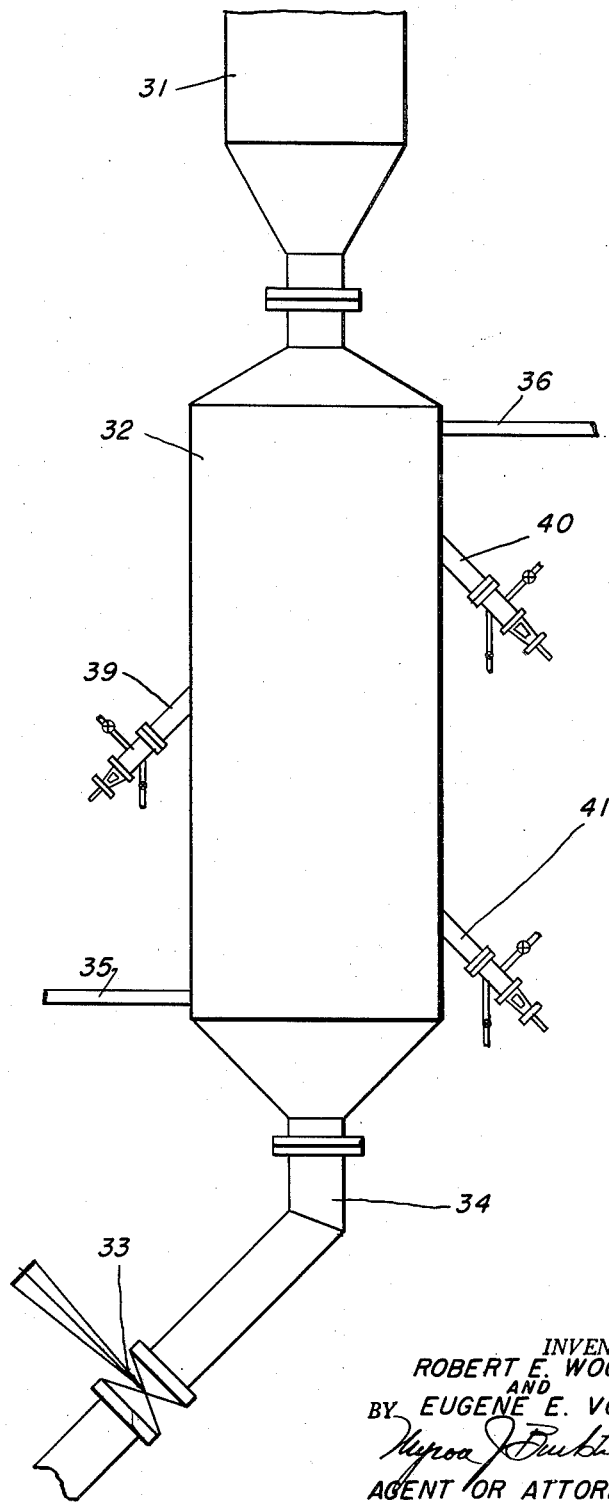

2,516,097

UNITED STATES PATENT OFFICE 2,516,097

CATALYST SAMPLER

Robert E. Woodham and Eugene E. Volpi, Beaumont, Tex., assignors to Socony-Vacuum Oil Company, Incorporated, New York, N. Y., a corporation of New York Application May 11, 1948, Serial No. 26,286

7 Claims. (Cl. 23—288)

This invention is concerned with the conduct of reactions performed in a closed vessel. It is primarily designed to improve the control of catalytic cracking of petroleum hydrocarbons in a reaction vessel.

The skyrocketing demand for gasoline, in recent years, to fuel the internal combustion engine, has made it necessary to increase markedly the yield of gasoline per barrel of crude petroleum. This has been accomplished, in large measure, by cracking some of the heavier fractions of the petroleum into fuels boiling in the gasoline range. Cracking of heavy distillates can be accomplished by subjecting the hydrocarbons to heat and pressure in a closed vessel.

Industry has not only demanded ever-increasing quantity of petroleum products, particularly gasoline, but also has demanded concomitantly products of improved quality. This need has been obviated in many ways, such as, for example, the maintenance of more rigid control over the operating variables affecting the products produced by the various manufacturing reactions.

Although the types of compounds obtained, and the yields of suitable stocks, in the cracking operation are affected by all the interrelated variables, profound effects are produced by cracking in the presence of specific catalysts. The catalyst not only modifies the types of products produced in the cracking operation, but enables the reactions to be performed at low pressure and reduced temperature.

The cracking of petroleum hydrocarbons has recently been made continuous by processes such as the thermofor catalytic cracking process, wherein the catalyst in the form of a moving mass of particle size material, is passed continuously through and from a reaction vessel to a regeneration or revivification vessel, then through and from the regeneration vessel to the reaction vessel. The operating conditions are so arranged that the catalyst descends as a solid column through both the reactor and regenerator at a uniform rate under the influence of gravity, and the charge stock, previously prepared for treatment, is continuously added to the reactor and the cracked materials removed therefrom at a substantially uniform rate. Such systems are completely described in the various patents on catalytic cracking, such as those of Simpson, Payne, and Crowley, for example No. 2,419,507, and need not be described in detail here.

In order to obtain the desired end products, and the maximum yields thereof, it is essential that the various interrelated controlling factors be carefully regulated, such as catalyst flow rate, charge stock flow rate, charge stock preheat, reaction zone temperature, to mention a few. The present procedure comprises examining the end products, and changing the operating conditions until the desired products are formed in satisfactory quantity. The procedure is not sensitive and does not yield sufficient information concerning the condition of the reacting materials in the reactor. Knowledge of the conditions within the reactor during operation, makes possible increased yield of desired end products, and products of greater purity.

It is an object of this invention to provide a device for removing samples of material from the interior of a closed vessel.

It is a further object of this invention to provide a device for removing samples of material from the interior of a closed vessel in which reactions are being performed.

It is a further object of this invention to provide a device for removing samples of material from the reactor of a continuous, catalytic hydrocarbon conversion apparatus, when the reactor is in operation.

It is a further object of this invention to improve the control of the interrelated factors which in the reactor of a continuous, catalytic hydrocarbon conversion apparatus, are responsible for the determination of the amounts and types of hydrocarbons formed.

This invention will be described in detail by reference to the attached drawings, in which;

Figure 1 is a vertical elevation of a mechanism embodying the instant invention, a portion of which is sectioned, and;

Figure 2 is a vertical elevation of a continuous, catalytic hydrocarbon reactor incorporating the instant invention.

Referring to Figure 1, a small section of the wall of a catalytic, cracking reactor 1 is shown to the outside of which an adapter 2 is welded. A sampling tube 3, projecting into the reactor 1, is attached to the adapter 2 by the mating flanges 4 and 5, sealed by a gasket 6. The tube 3 is preferably located at an angle of about 45 degrees to the vertical, and supported at its upper end by the collar 8, which is clamped securely to the tube periphery. The collar 8 is supported inside the reactor 1 by means of the rods, 9, 9, which are welded to the inside of the reactor shell. A cylindrical cap 10 is located over the upper end of the tube 3. A hole 16 in the side wall of the cylindrical cap 10, which is substantially sealed by the wall of the tube 3 when the cap is in the closed position, defines a passageway connecting the inside of the reactor 1 with the interior of the tube 3, when the cap is moved longitudinally relative to the tube 3. A rod 14 is positioned through the tube 3 parallel to the axis of the tube, and both ends of the rod 14 project from the tube 3. The upper end of the rod is welded to the cap 10 and the lower end, which is threaded, is passed through a valve bonnet 11, which is attached to a flange 7, welded to the bottom of tube 3. A nut 13, mated with the threads on the rod 14, is adapted to be turned by the handwheel 12, in a manner analogous to the operation of a rising stem valve, to move the cap 10 to the open position. The cap 10 is prevented from rotating by a lug 15, welded to the outside surface of the tube 3, and located in a longitudinal slot cut in the cap 10. After a sample of the materials in the reactor 1 has entered the interior of the tube 3, the cap 10 is placed in the closed position, substantially sealing the interior of the tube 3 from the interior of the reactor 1. The cap 10 is adjusted, relative to the tube 3, such that when the cap is in the closed position, there is sufficient communication between the interior of the tube 3 and the interior of the reactor 1 to permit the passage of fluids, but the passage of catalyst is prevented. The solid and liquid material can then be withdrawn from the tube 3 through pipe 16 by opening the valve 18. A suitable sampling chamber, not shown, is attached to the coupling 20 to receive the sample. In a similar manner, gas or vapor samples may be taken through pipe 17 by opening the valve 19. A suitable gas or vapor receiving chamber, not shown, is attached to the coupling 21 to receive the sample. When the cap 10 is in the closed position, fluid samples may be taken without removing solid catalyst. Furthermore, when the tube 3 is filled with a sample of catalyst, steam may be admitted to the tube 3, through pipe 17, to purge the chamber of gases and vapor and to halt the cracking reaction. The excess steam escapes through the small opening in the cap 10 into the reactor 1. Thus the catalyst may be examined externally in the precise state in which it is found in the reactor.

By this invention, all the materials in the reactor can be analyzed periodically or almost continuously as the cracking operation is in progress. This intelligence is used to make sensitive adjustments of the operating variables to produce only the desired products in maximum yield. In practice, this invention reduces to a minimum the lag between the inspection of the products and the adjustment of the controls. It furthermore makes possible the inspection of the catalyst during operation of the reactor to determine the catalyst surface condition.

In a favored application of this invention, several locks are used to obtain representative samples of material from a variety of stations in the reactor. Study of the analyses of samples from all the stations prevents control decisions from being based upon possible localized conditions. Such an application is shown in Figure 2. Catalyst, previously heated to a high temperature, is passed, under the influence of gravity, from the storage hopper 31 down through the reactor 32 at a uniform controlled rate of flow. The catalyst flow rate can be conveniently controlled by the valve 33 located below the reactor. The spent catalyst, after leaving the reactor, is conducted through conduit 34 to the bottom of an elevator, not shown, for further transfer through the catalyst system. The preheated hydrocarbon charge is admitted to the bottom of the reactor 32 through conduit 35 from a source not shown. The heated hydrocarbons pass up through the reactor 32, in intimate contact with the hot catalyst, and the cracked distillates are removed from the reactor through the conduit 36 to the product fractionation and recovery apparatus not shown. The locks, such as, for example, locks 39, 40 and 41, are located about the periphery and along the length of the reactor 32, to obtain representative samples of the materials therein from all sections of the reactor 32. From analyses of these samples, rapid adjustment of the operating variables are made to produce the maximum, most-efficient yields of the desired end products.

We claim:

1. In a continuous system for the catalytic cracking of petroleum hydrocarbons comprising means for passing the catalyst particles continuously downward through a reactor and a regenerator, means for conducting the catalyst at a uniform rate from the bottom of the reactor to the top of the regenerator and from the bottom of the regenerator to the top of the reactor, the improvement which comprises a means for removing a sample of materials from the reactor while in operation, said means comprising a tube passing through the wall of said reactor, means for sealing the outer end of the tube from the atmosphere, a cap disposed over the inner end of the tube, a rod welded at one end to said cap and threaded at the other end, a bushing around said rod in a fixed position relative to said reactor, a handwheel free to rotate on said bushing, a nut fastened to the hub of said handwheel and engaged with said threads on said rod, in said cap a hole so positioned as to be capable of being placed in open or substantially closed position by the rotation of said handwheel, pipes connected to the outer end of said tube for conducting samples to sampling chambers and valves in said pipes for controlling the flow of samples through said pipes.

2. In a continuous system for the conversion of hydrocarbons wherein reactant fluids are contacted at high temperature with a comminuted solid contact material in a reaction vessel, apparatus for removing samples of solid contact material and fluids from said vessel comprising: a tube passing through the wall of said vessel sealed at its outer end from the atmosphere, a cap disposed over the inner end of the tube, means for sliding said cap on said tube to cut the interior of said tube out of communication with the interior of said vessel, means defining outlets from said tube located outside of said vessel, and means for controlling the flow of solid contact material and fluids from said outlets.

3. In a continuous system for the conversion of hydrocarbons wherein reactant fluids are contacted with a comminuted solid contact material in a reaction vessel, apparatus for removing samples of solid contact material and fluids from said vessel comprising: a tube passing through the wall of said vessel projected into the vessel in an upward direction, said tube sealed at its outer end from the atmosphere, a cap disposed over the inner end of the tube, means for sliding said cap on said tube to cut the interior of said tube out of communication with the interior of said vessel, means defining outlets from said tube located outside of said vessel, and means for controlling the flow of solid contact material and fluids from said outlets.

4. In a continuous system for the conversion of hydrocarbons wherein reactant fluids are contacted with a comminuted solid contact material in a reaction vessel, apparatus for removing samples of solid contact material and fluids from said vessel comprising: a tube passing through the wall of said vessel projected into the vessel in an upward direction, said tube sealed at its outer end from the atmosphere, the inner end of said tube oblique to the tube axis, a cap disposed over the inner end of the tube, means for sliding said cap on said tube to cut the interior of said tube out of communication with the interior of said vessel, means defining outlets from said tube located outside of said vessel, and means for controlling the flow of solid contact material and fluids from said outlets.

5. In a continuous system for the conversion of hydrocarbons wherein reactant fluids are contacted with a comminuted solid contact material in a reaction vessel, apparatus for removing samples of solid contact material and fluids from said vessel comprising: a tube projected into said vessel in an upwardly direction, said tube sealed at its outer end from the atmosphere, the inner end of said tube oblique to the tube axis, a cap disposed over the inner end of said tube, in the side wall of said cap a hole, means for sliding said cap on said tube to position said hole and control communication between said tube and said vessel, means defining outlets from said tube located outside of said vessel, and means for controlling the flow of solid contact material and fluids from said outlets.

6. In a continuous system for the conversion of hydrocarbons wherein reactant explosive fluids are contacted with a comminuted solid contact material in a reaction vessel, apparatus for removing samples of solid contact material and fluids from said vessel comprising: a tube projected into said vessel in an upwardly direction, said tube sealed at its outer end from the atmosphere, the inner end of said tube oblique to the tube axis, a cap disposed over the inner end of said tube, in the side wall of said cap a hole, a lug affixed to the external surface of the inner end of said tube, a longitudinal slot in said cap fitting said lug to prevent rotation of said cap, means for sliding said cap on said tube to bring the hole in said cap into and out of register with the side wall of said tube to open or close the interior of the tube to the interior of the vessel, means defining outlets from said tube located outside of said vessel, and means for controlling the flow of solid contact material and fluids from said outlets.

7. In a continuous system for the conversion of hydrocarbons wherein reactant explosive fluids are contacted with a comminuted solid contact material in a reaction vessel, apparatus for removing samples of solid contact material and fluids from said vessel comprising: a tube projected into said vessel in an upwardly direction, said tube sealed at its outer end from the atmosphere, the inner end of said tube oblique to the tube axis, a cap disposed over the inner end of said tube, in the side wall of said cap a hole, a lug affixed to the external surface of the tube located near the inner end thereof, a longitudinal slot in said cap fitting said lug to prevent rotation of said cap, a rod substantially concentric with said tube attached at the inner end of the tube to said cap, the lower end of said rod projected out of the sealed end of said tube, means for moving the rod longitudinally to open or close the hole in said cap to provide communication between the interior of said tube and the interior of said vessel, means defining outlets from said tube located outside of said vessel, and means for controlling the flow of solid contact material and fluids from said outlets.

ROBERT E. WOODHAM.
EUGENE E. VOLPI.

REFERENCES CITED

The following references are of record in the file of this patent:

UNITED STATES PATENTS

| Number | Name | Date |
| --- | --- | --- |
| 1,966,712 | Fisher et al. | July 17, 1934 |
| 2,012,836 | Talbot et al. | Aug. 27, 1935 |
| 2,370,260 | Robison | Feb. 27, 1945 |
| 2,416,230 | Simpson | Feb. 18, 1947 |
| 2,416,214 | Payne | Feb. 18, 1947 |

FOREIGN PATENTS

| Number | Country | Date |
| --- | --- | --- |
| 574,892 | Great Britain | Jan. 24, 1946 |

OTHER REFERENCES

"Thermofor Catalytic Cracking Unit," Industrial and Engineering Chemistry, vol. 39, No. 12, Dec. 1947, pp. 1685–1690.

"Carbon Formation in Catalytic Cracking," The Petroleum Engineer, vol. 16, No. 10, July 1945, pp. 248–260.